United States Patent [19]

Cruz

[11] Patent Number: 5,309,867

[45] Date of Patent: May 10, 1994

[54] SQUIRREL-PROOF BIRD FEEDER

[76] Inventor: Julio V. Cruz, 7712 A Ray Street, Fort G. Meade, Md. 20755

[21] Appl. No.: 77,220

[22] Filed: Jun. 14, 1993

[51] Int. Cl.$^5$ ............................................. A01K 39/00
[52] U.S. Cl. .................................................. 119/52.3
[58] Field of Search ................... 119/57.8, 57.9, 52.3, 119/52.4, 52.2

[56] References Cited

U.S. PATENT DOCUMENTS

| | | | |
|---|---|---|---|
| D. 320,678 | 10/1991 | Handley | D30/124 |
| 2,918,901 | 12/1959 | Poulsen | 119/52.3 |
| 2,931,336 | 4/1960 | Cather | 119/52.3 |
| 3,083,687 | 4/1963 | Slaven | 119/57.8 X |
| 3,124,103 | 3/1964 | Stainbrook | 119/52.3 |
| 4,541,362 | 9/1985 | Dehls | 119/51 R |
| 5,048,461 | 9/1991 | Wessner | 119/52.3 |
| 5,105,765 | 4/1992 | Loken | 119/57.9 |

*Primary Examiner*—Thomas Price

[57] ABSTRACT

A squirrel-proof bird feeder device with a metallic feed containment cavity having spaced and parallel side walls, a front wall spaced and parallel to a rear wall, a retaining plate attached to the inside of the front wall, a floor mounted perpendicular to and between these walls, and a movable roof which can be secured to the front wall with a latch. Nourishment flows through a gap between a retainer plate and the floor into a feeding cavity in the forward section of the feeder. An opening on the front wall exposes the feeding cavity and its contents. A fence created by the lower edge of the opening keeps the feed with the boundaries of the feeding cavity. A balancing perch assemblage having a wooden platform, a gate plate, a metal frame, and a metal bar that serves as a weight surrounds the front, side, and rear walls. This perch mounts to left and right supporters that pivot on respective left and right trunnions located on the lower sections of the side walls. The platform, the gate plate, and the weight are operationally associated to regulate access to the feeding cavity by having a feeding position and a non-feeding position, both determined by the weight of the bird sitting on the platform. The gate plate is substantially located inside the feeding cavity in an angular fashion to effect an open position in which permits access to the feeding cavity and a closed position which shuts the cavity.

14 Claims, 10 Drawing Sheets

SQUIRREL-PROOF BIRD FEEDER

BACKGROUND FIELD OF INVENTION

This invention relates to bird feeders, and particularly to a new and improved bird feeder which permits birds to access food while excluding large birds and other animals,

BACKGROUND—DESCRIPTION OF PRIOR ART

Mechanical devices have been used to provide feed for small birds while denying access to large birds and other animals. Many of such devices are designed with sliding plates, perches, chains and springs that result in feeders difficult to operate and that fail to function properly under severe weather conditions. Many are also constructed from materials that are not weather resistant. Additionally, most feeders don't provide easy access to their feeding cavities, a feature necessary for the removal of wet or fouled nourishment.

Among the squirrel-proof bird feeders that have been proposed is the device shown in U.S. Pat. No. 5,105,765 (1992) to Loken which regulates access to the nourishment by means of a tiltable perch. The opening through which the nourishment is offered stays open regardless of the position of the perch. For this reason, an animal such as a squirrel would be able to nourish by avoiding the perch. To discourage squirrels from climbing the feeder, a combination of a baffle and a pipe is used. This arrangement, however, stops squirrels only when the feeder is erected far away from standing objects such as walls, fences, or trees.

U.S. Pat. No. 5,048,461 (1991) to Wessner uses tiltable perches activated by a set of weights and springs. These perches are connected to plates that slide vertically to control access to the contents of the feeder. This arrangement is cumbersome, since it relies on individual sets of 1, ½, and ¼ lbs weights that must be attached to the perches in order to adjust their tilting action. If one of the weights were lost, it would limit the type and number of birds that would be able to nourish. Another drawback of this design is that the vertical sliding plates may jam because of ice buildup during cold weather. Food leftovers could also jam the plates, rendering the feeder inoperative.

U.S. Pat. No. 4,541,362 (1985) to Dehls is a feeder that has a tiltable perch assemblage connected to a vertical plate. The tilting action of the perch is controlled by the tension exerted by a wire, spring, and chain assemblage attached to the top of the plate and to the roof of the feeder. Holding the perch with a spring is not an efficient, long-term method because the tension exerted by the spring will decrease due to the reshaping of the spring itself. This reshaping will require frequent adjustments to the perch and, at the long run, replacement of the spring. Additionally, the arrangement of the gate, perch, and awning provides for a small opening to the feeding cavity, limiting access to even small birds and making it difficult to clean. Moreover, the feeder was designed to be hung on a wall, which allows squirrels access to the feeding cavity by attaching themselves to the wall and the upper body of the feeder thus avoiding the perch altogether.

U.S. Pat. No. 320,678 (1991) to Handley shows a design of a bird feeder which has a tiltable perch, a vertical plate that shuts the feeding cavity, and a weight to control the movement of the perch. The fixed-weight method does not provide a means for adjusting the tilting action of the perch, thus limiting the type and number of birds that can get nourishment. Another drawback of this feeder is that it has a small feeding cavity which limits the amount of nourishment exposed to birds. Its feeding cavity is also difficult to clean, an important factor to consider since old, wet nourishment will induce diseases among birds.

So it can be seen that despite of the designs that have been proposed, there still is a need for an efficient squirrel-proof bird feeder easy to operate, clean, and maintain and with a spacious feeding cavity to expose the maximum amount of nourishment possible while maintaining a squirrel-proof capability. My feeder substantially fulfills these and other requirements.

OBJECTS AND ADVANTAGES

Accordingly, several objects and advantages of the present invention are:

(a) to provide a bird feeder that selectively controls access to the nourishment by closing the feeding cavity with a gate;

(b) to provide a bird feeder made of a weatherproof materials that resist persistent chewing from rodents such as squirrels;

(c) to provide a bird feeder with a novel feeding cavity design that uses the forward-third of its floor area for the exposure of feed, providing a substantial amount of nourishment while controlling access to the cavity;

(d) to provide a bird feeder economical to operate;

(e) to provide a selective bird feeder with a novel tilting perch and gate assemblage that will function properly in harsh environments;

(f) to provide a selective bird feeder with a balancing platform that can be adjusted to accommodate for different types of birds;

(g) to provide a selective bird feeder with components that don't have to be added to or removed from the feeder's assemblage in order to adjust and operate its balancing platform;

(h) to provide a bird feeder that mounts to a pole without the need for screws for its securement;

(i) to provide a bird feeder easy to refill and which will accept any kind of bird seed;

(j) to provide a bird feeder with a platform for birds to stand and consume their nourishment;

(k) to provide a bird feeder with a movable roof that can be secured to the body of the feeder by means of a simple, yet efficient, locking mechanism;

Further objects and advantages of the present invention are to provide a bird feeder with a feeding cavity that allows for easy removal of wet or fouled nourishment, which can be erected near any structure, which will deter squirrels from having access to the feed even when they approach the feeding cavity from the roof of the feeder. Still further objects and advantages will become apparent from a consideration of the following description and drawings.

DESCRIPTION OF DRAWINGS

Other advantages and features of the present invention will become apparent as the invention becomes better understood by referring to the following drawings.

LIST OF REFERENCE NUMERALS

Figure 1:
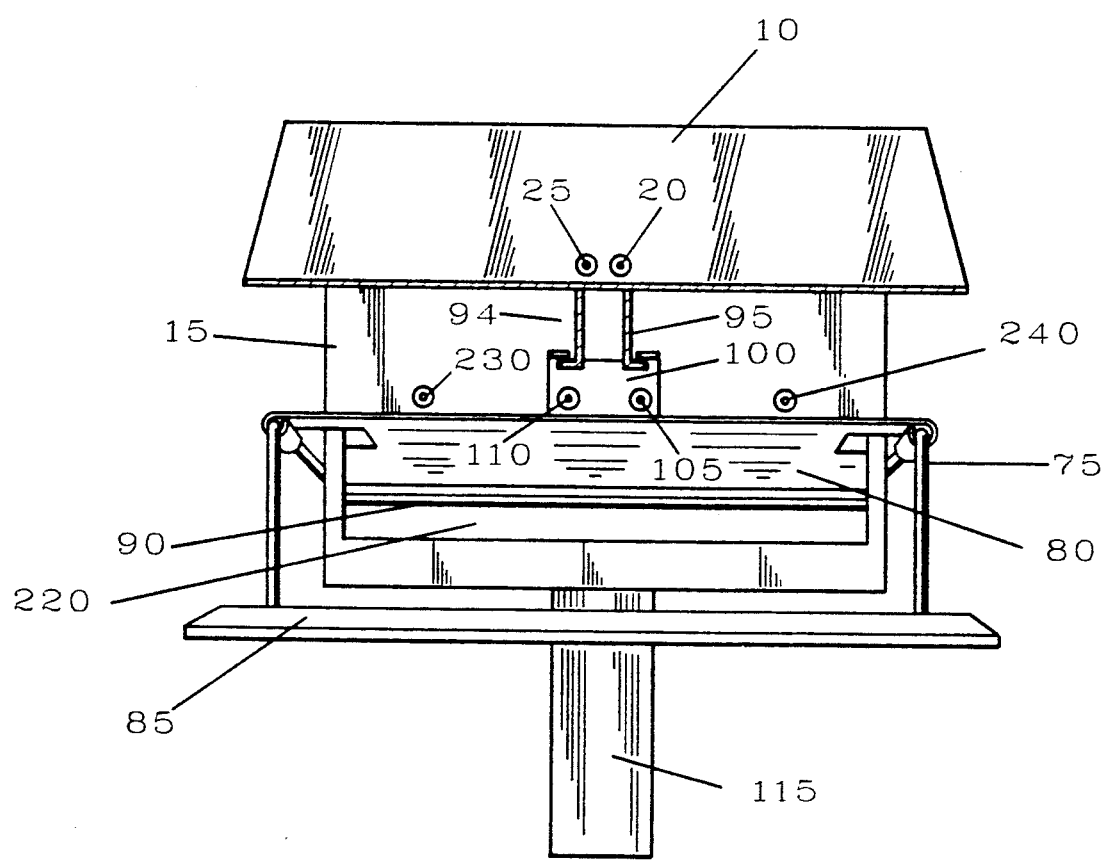
FIG. 1 shows a front view of the bird feeder.

The following list of reference numerals and the names of their respective parts will enhance the understanding of the present invention:

10 Roof Plate, 15 Front Wall, 20 Rivet, 25 Rivet, 35 Rivet, 40 Rivet, 45 Rivet, 50 Roof Hinge, 55 Rivet, 60 Rivet, 65 Rivet, 70 Supporter, 75 Frame, 80 Gate Plate, 85 Platform, 90 Rod, 94 Latch Assemblage, 95 Upper Lock, 100 Lower Lock, 105 Rivet, 110 Rivet, 115 Stand, 120 Side Wall, 125 Weight, 150 Rivet, 155 Rivet, 160 Rivet, 165 Rivet, 170 Rivet, 175 Rivet, 180 Rear Wall, 185 Rivet, 190 Rivet, 195 Rivet, 200 Rivet, 205 Rivet, 206 Rivet, 210 Floor, 215 Retainer Plate, 220 Feeding Cavity, 225 Opening, 230 Rivet, 240 Rivet, 245 Wing Nut.

DESCRIPTION—FIGS. 1 TO 6

Figure 2:
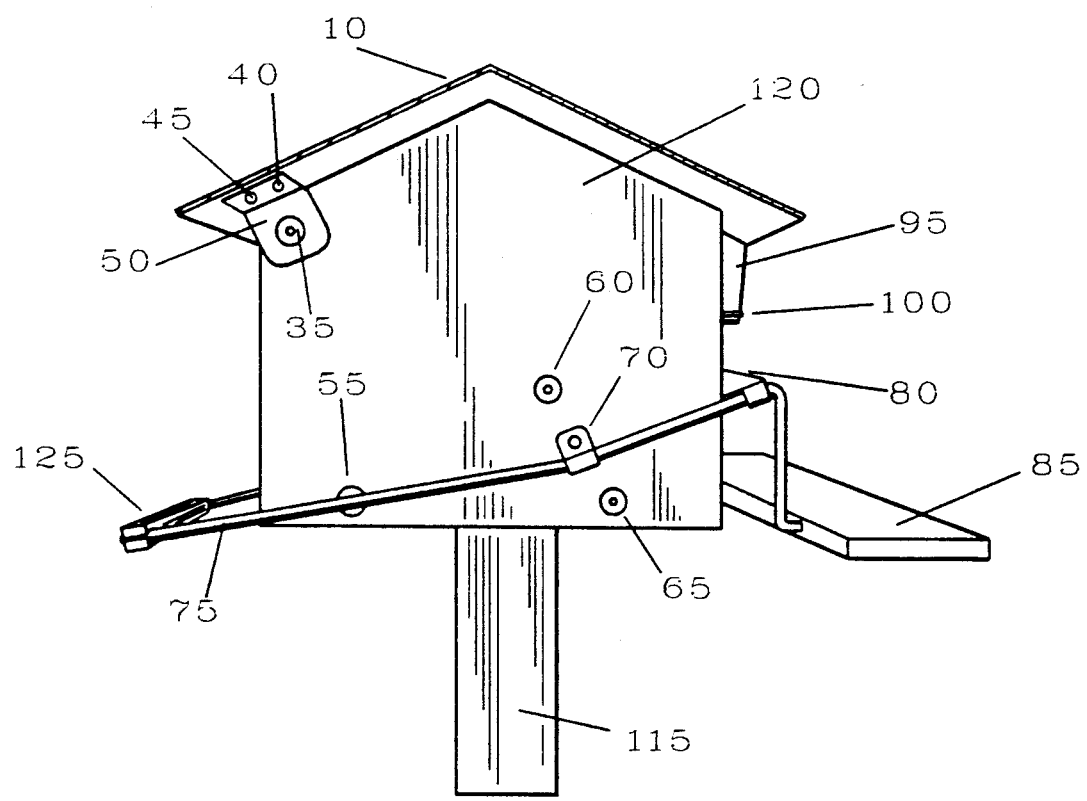
FIG. 2 shows a right-side view of the bird feeder. The opposite side is a mirror image of the structure shown in this figure.
Figure 3:
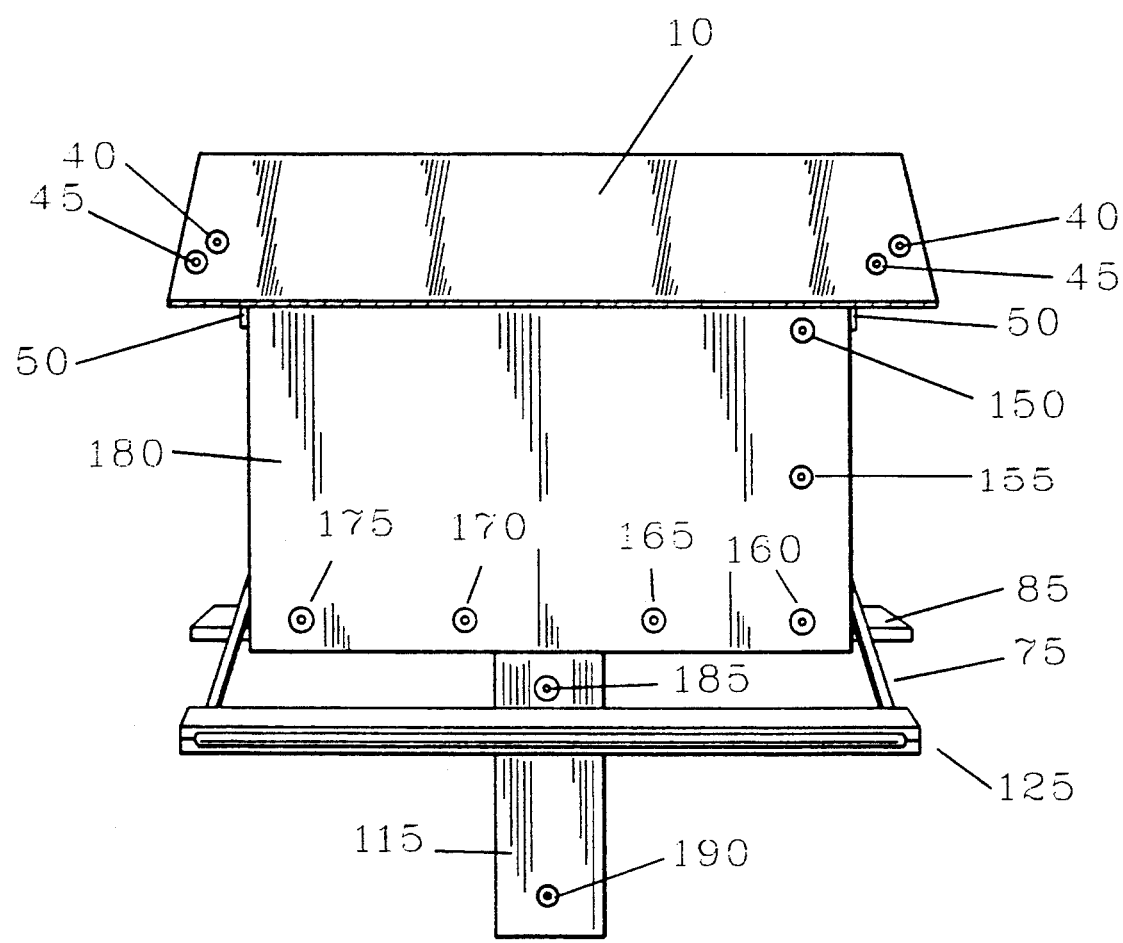
FIG. 3 shows a rear view of the bird feeder.
Figure 4:
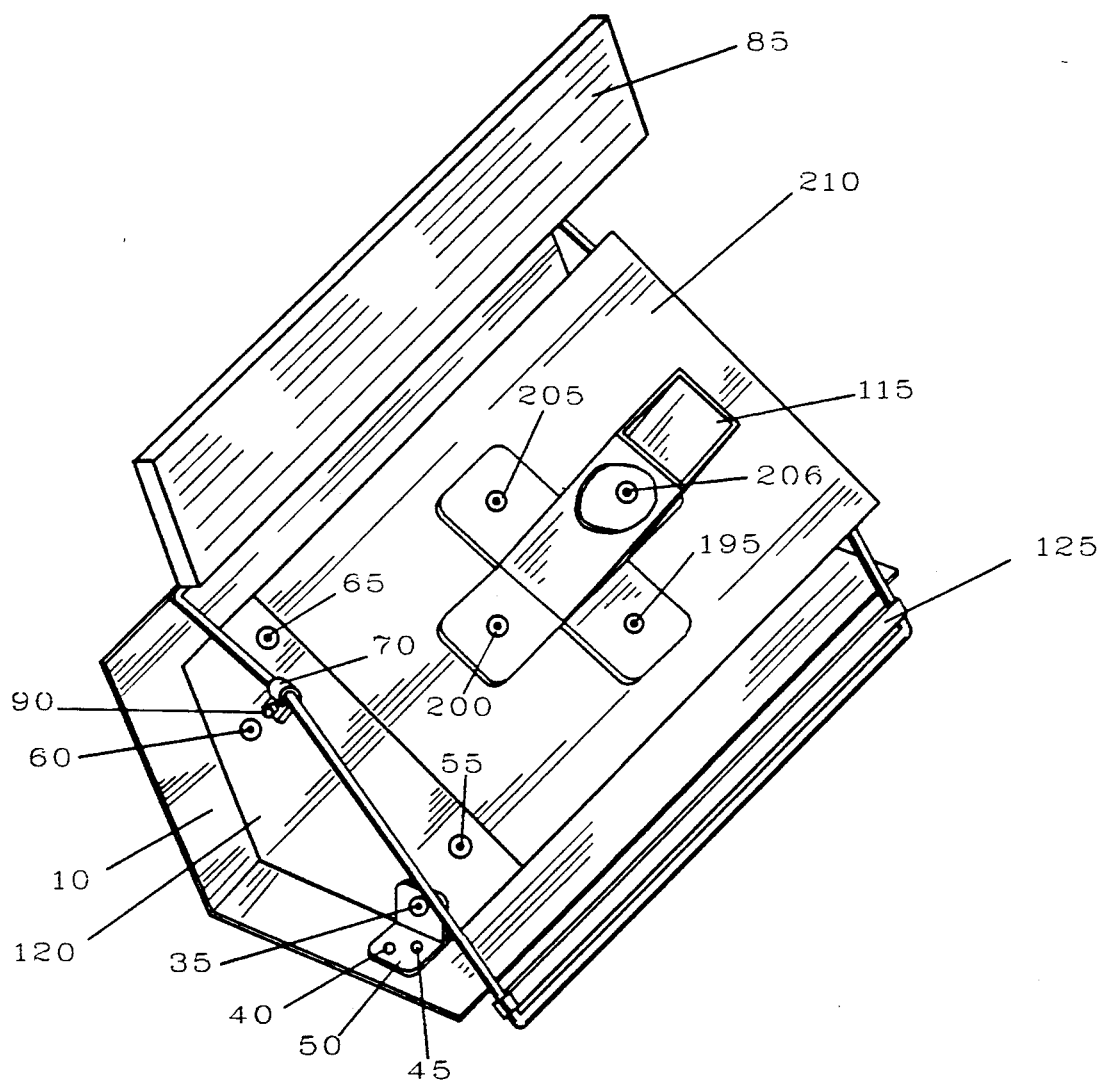
FIG. 4 shows a bottom view of the bird feeder.
Figure 5:
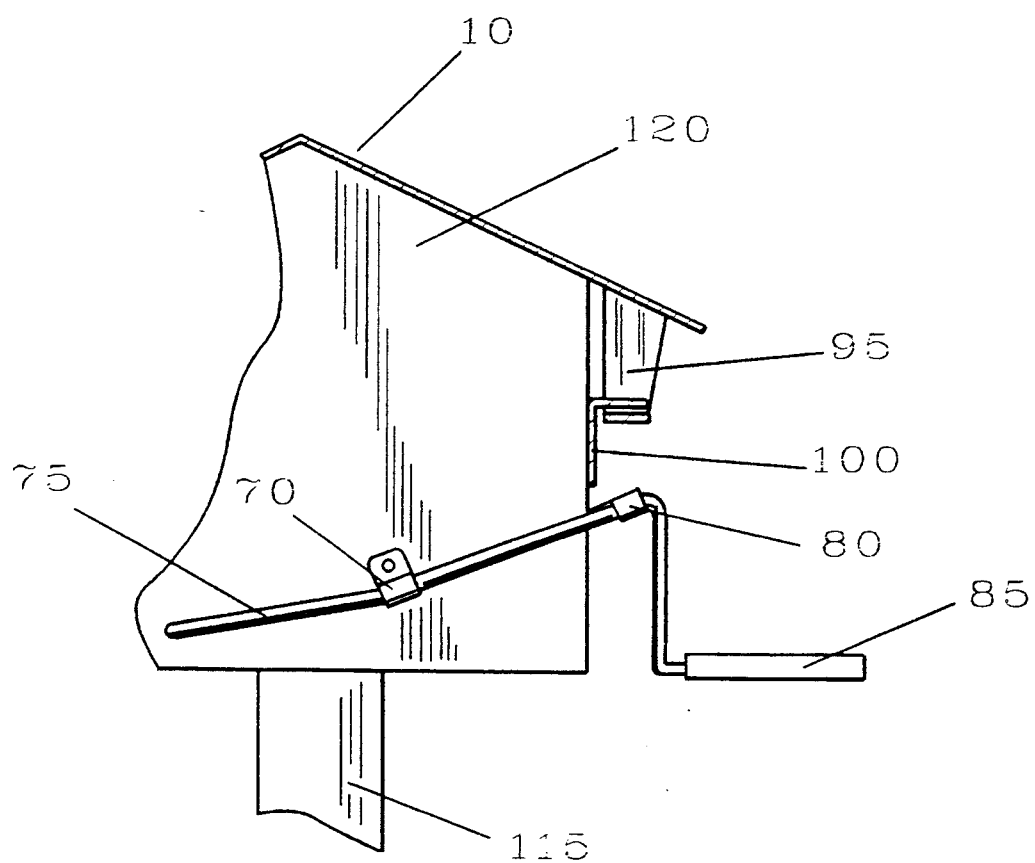
FIG. 5 is a right-side view of the bird feeder, showing the location of the locking mechanism in relation to the front wall and the roof. The opposite side is a mirror image of the structure shown in this figure.
Figure 5A:
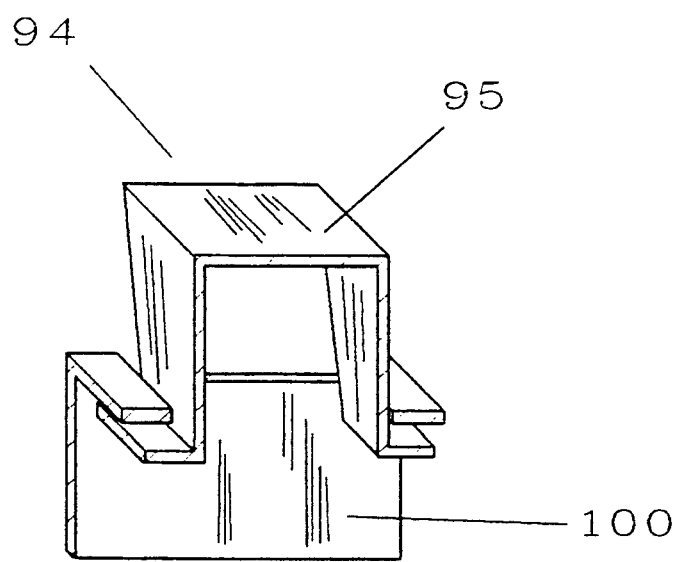
FIG. 5A shows the locking mechanism used to secure the roof to the front wall of the bird feeder.
Figure 6:
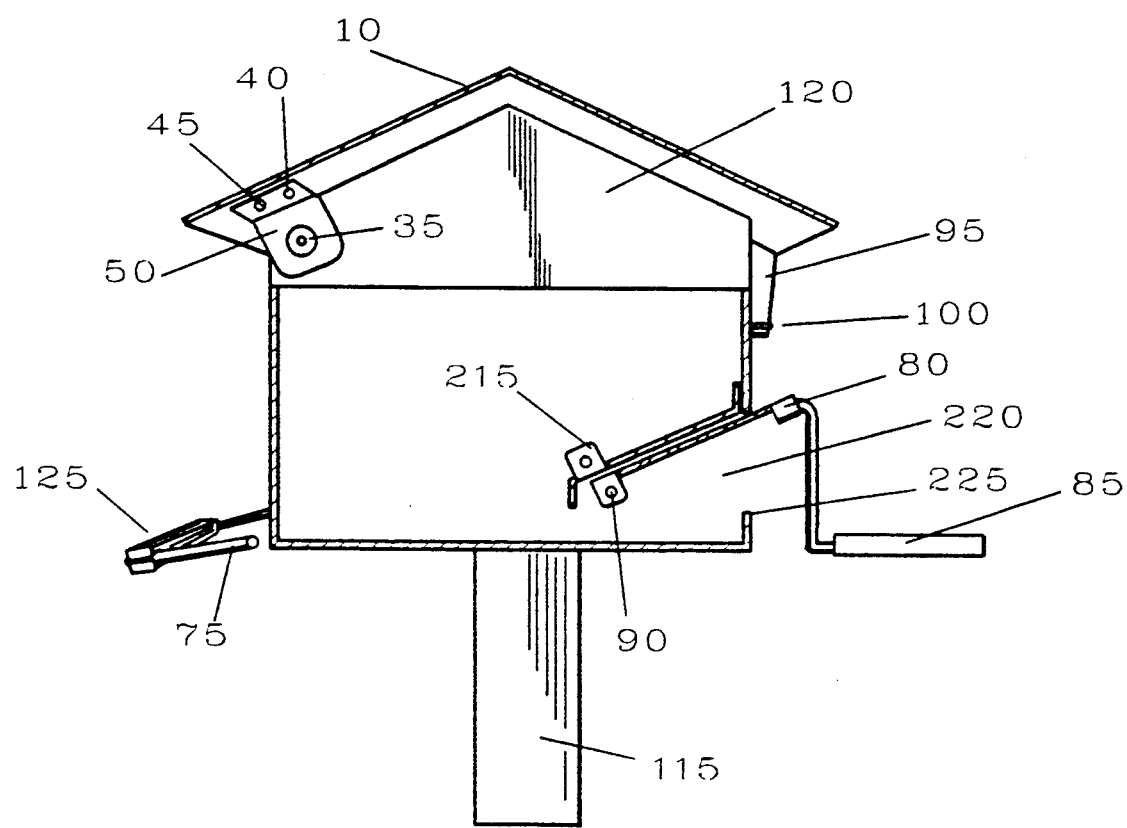
FIG. 6 is a partial cut away view through the right wall of the bird feeder, illustrating the gate plate in the open position and its association with the retainer plate, the perch platform, and the weight.
Figure 6A:
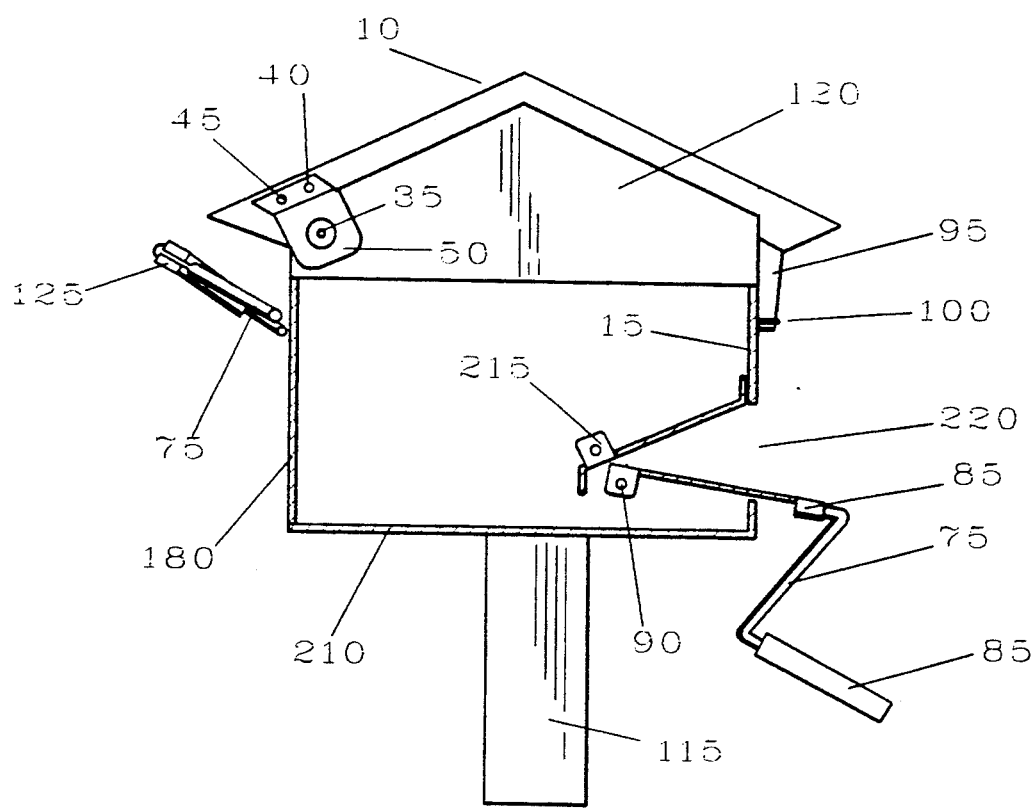
FIG. 6A is a partial cut away view through the right wall of the bird feeder, illustrating the gate in a closed position and its association with the perch platform, the retainer plate, and the weight.
Figure 7:
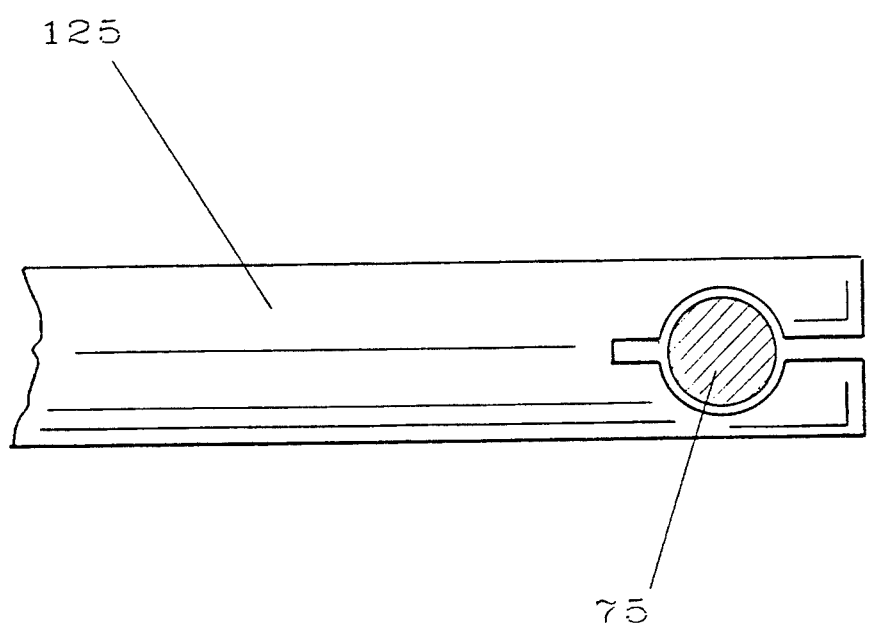
FIG. 7 is a view of one of the extremities of the weight, depicting the method used for securing the weight to the frame.

A typical embodiment of the present squirrel-proof bird feeder invention is illustrated in FIGS. 1 to 6. The present invention comprises an enclosure defined by spaced and parallel walls 120 (FIG. 2), a front wall 15 (FIG. 1) spaced and parallel to a rear wall 180 (FIG. 3), a floor 210 (FIG. 4) and a roof plate 10 (FIG. 4). Walls 15, 120, and 180 are vertically mounted to floor 210 and secured by means of rivets 55, 65, 160, 165, 170, and 175 (FIGS. 3 and 4). Roof plate 10 extends overlying the upper end portions of side walls 120, front wall 15, and rear wall 180, with an overhang that affords protection against the weather. Attached to roof plate 10 is an upper lock 95 which connects to a lower lock 100 to form a latch assemblage 94 (FIGS. 1, 5, and 5a). Upper lock 95 is centrally mounted to the front overhang of roof plate 10 by means of rivets 20 and 25; lower lock 100 is secured to wall 15 with rivets 105 and 110, and its placement on front wall 15 allows for an interlocking action with upper lock 95. Connection of roof 10 to side walls 120 is achieved by securing the rear corners of roof 10 to a roof hinge 50 using rivets 40 and 45. Roof hinge 50 is in turn secured to side walls 120 by means of rivets 35 which allow for the rotation of roof plate 10. As FIGS. 1 and 4 show, a rod 90 is mounted parallel to front wall 15 and floor 210 and extends beyond and outwards through holes located at the lower ends of side walls 120, resulting in a self-supporting hanging structure. The tips of rod 90 form right and left trunnions that provide securement to left and right supporters 70 (FIG. 2). Supporters 70 are mounted at their upper terminals to their respective left and right trunnions. The lower terminals of supporters 75 wrap around respective left and right sections of a frame 75 that circumvents side walls 120 and rear wall 180. As FIG. 3 shows, frame 75 holds a weight 125 made of a metal bar mounted along the lower end terminal of frame 75 by means of grooves located at the tips of the bar. These tips attach to respective left and right sections of frame 75. Weight 125 is secured to frame 75 by having its tips pressed against their respective sections of frame 75, as shown in FIG. 7. The upper end terminal of frame 75 holds a platform 85 made of a rectangular piece of wood. As shown in FIGS. 1, 6, and 6a, a gate plate 80 is tethered to and pivots on rod 90 by U-shaped perpendicular flanges located at the rear left and right corners of the lower end terminal of the gate plate. The front end terminal of gate plate 80 extends beyond front wall 15 and outwards through a rectangular opening 225 that leads to a feeding cavity 220 created by the intersections of front plate 15, the forward sections of side walls 120, the forward section of floor 210, and a retainer plate 215. The front end terminal of gate plate 80 connects to frame 75 by means of flanges located at the front left and right corners of the gate plate and which wrap around their respective sections of frame 75. Gate plate 80 is substantially placed inside feeder cavity 220 and has an open position in which assumes a near 45 degree stance, meeting with the upper edge of opening 225 and exposing the contents of feeding cavity 220. Gate plate 85 also has a closed position in which the front edge terminal faces downwards, making contact with a fence created by the lower edge of opening 225 which stops the feed from flowing out of the feeding cavity. As shown if FIGS. 6 and 6a, retainer plate 215 has a Z-shaped geometry and lies above rod 90 and gate plate 80. Retainer plate 215 has a forward flange pointing upwards in the vertical plane, rear left and right U-shaped flanges perpendicular to the retainer's face, and a rear flange pointing downwards in the vertical plane. Retainer plate 215 is secured to the internal face of front wall 15 by means of rivets 230 and 240 imbedded through the retainer's front wall 15 and the retainer's front flange. Securement of the retainer to side walls 120 is done by rivets 60 imbedded through side walls 120 and the retainer's rear left and right flanges. Between floor 210, rod 90, and the lower terminal of retainer plate 215 exists a gap through which the feed contained in the embodiment created by side walls 120, front wall 15, rear wall 180, and floor 210 flows into feeding cavity 220. As indicated in FIG. 4, a stand 115 is centrally mounted to floor 210 by rivets 195, 200, 205, and 206 imbedded through perpendicular flanges flaring from one end of the stand. Rivets 185 and 190 secure the overlapping ends of stand 115, maintaining its shape.

OPERATIONS—FIGS. 1 TO 6

The main features of the present bird feeder invention reside in the novel design of its feeding cavity, gate plate, and roof as well as the operational association of its perch platform, the gate plate, and weight to selectively control access to the feeding cavity. The bird feeder holds its nourishment in a container created by the intersection of side walls 120, front wall 15, floor 210, rear wall 180, and retainer plate 215, as shown in FIGS. 6 and 6a. Nourishment flows through a gap created by the lower terminal of retainer plate 215 and floor 210 and spreads over the forward-third section of floor 210. The feed contained in feeding cavity 220 is confined to the cavity by means of a fence created by the lower edge of openning 225 which stops the feed from flowing out of the feeder. To refill the feeder, roof plate 10 is rotated upwards and feed is poured inside of the feeder. Once refilling is complete, roof plate 10 is rotated downwards and secured to the feeder by engaging latch assemblage 94 as shown in FIGS. 5 and 5a. To engage the latch, roof plate 10 is rotated downwards and the legs of upper lock 95 are squeezed. Rotation of roof plate 10 is continued until the legs of upper lock 95 lay under the flanges of lower lock 100, then upper lock 95 is released. To disengage latch assemblage 94, the legs of upper lock 95 are squeezed, roof plate 10 is rotated upwards, and upper lock 95 is released once it clears the flanges of lower lock 100. As shown if FIGS. 6 and 6a, access to feeding cavity 220 is determined by the position of gate plate 80, which in turn depends of the simultaneous tilting action of platform 85 and weight 125. Weight 125 determines the maximum weight of the bird allowed to sit on platform 85 and nourish from feeding cavity 220. When a bird that weighs less than the force exerted by weight 125 sits on platform 85, gate plate 80 remains in its open position, allowing access to the feeding cavity. On the other hand, when a bird or any other animal weighing more than the downward force exerted by weight 125 steps on platform 85, it pushes platform 85 downwards, rotating gate plate 80 down until it contacts the lower edge of opening 225, shutting feeding cavity 220. Once the animal steps off the platform, the balancing action of weight 125 takes over, and rotates both platform 85 and gate plate 80 up back to their open position. The tilting action of platform 85 can be adjusted to accommodate any kind of birds by moving weight 125 to selected positions on the rear end terminal of frame 75. As a rule, the closer weight 125 is set from rod 90, the less weight platform 85 can support without tilting down.

SUMMARY, RAMIFICATIONS, AND SCOPE

Figure 7A:
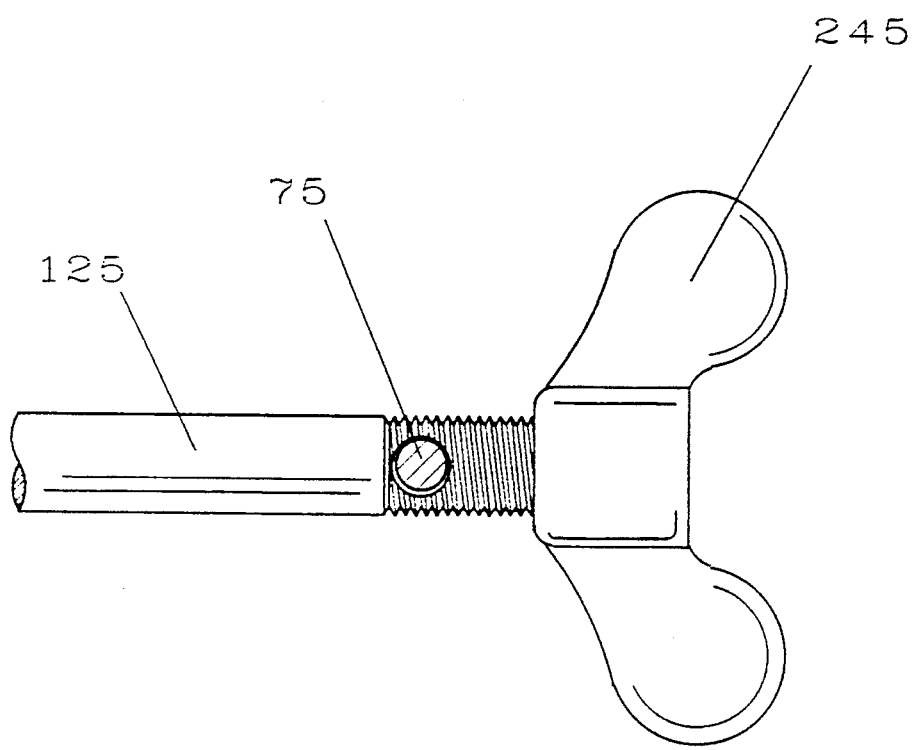
FIG. 7a is a view of one of the extremities of the weight, depicting an alternate method for securing the weight to the frame.

Many variations in materials, parts, and operation can be conceived from the concepts implemented in the present bird feeder invention. Metal is the preferred material for the construction of the feeder's embodiment, with the exeption of the platform which is wooden, because it is weatherproof and resists persisting bitings from rodents such as squirrels. Plastic could also be used for its contruction. The preferred material for platform 85 is wood because its insulating qualities provide comfort to birds, especially in freezing or hot climates. Sheet metal could also be used for the construction of the platform. Lead is the preferred material for the weight 125 because its high density allows a small bar to induce a significant balancing action on the perch platform. Other metals such as iron, steel, and cooper could also be used as weights. As FIG. 7 shows, weight 125 is secured to frame 75 by having its tips pressed against their respective sections of the frame. FIG. 7a shows an alternate method for attaching the weight to the frame, a method which could be applied to weights made of hard metals such as steel, iron, or cooper. In this setup, right and left sections of frame 75 are inserted through respective left and right holes located near the ends of weight 125. Bach end of the weight is threaded to accept a wing nut 245. Weight 125 is secured to the frame 75 by turning wing nut 245 clockwise until it contacts its respective section of the frame. To loosen up the weight, the wing nut is turned counterclockwise. In the preferred embodiment of the feeder, the weight can be repositioned along frame 75 to control the tilting action of platform 85. However, a bird feeder with a non-movable weight could also be designed. Another variation in the design of the present bird feeder invention could be the use of a piece of metal with a rectangular cross-section to construct frame 75, which in the preferred embodiment of the feeder is a wire. Small diameter holes could also be drilled on selected positions of floor 210 to allow for drainage. Yet another change to the present invention could be the use of a stand 115 of a different shape. Additionally, metal washers could be placed between roof hinges 50 and their respective side walls 120 to improve the rotation of the roof. Metal washers could also be placed between supporters 70 and their respective side walls 120 to improve the tilting action of the platform. Yet another change to the design of the present embodiment of the feeder could be the replacement of rod 90 with rivets or screws in order to support gate plate 80. Further, the present bird feeder invention has the additional advantages in that (a) its rectangular perch increases the total bottom area of the feeder, which deter squirrels from climbing to the top of the feeder. Additionally, the platform controls acces to the feeding cavity better that a rod-shaped perch because large birds and squirrels cannot hold easily on to a tilted platform. And another advantage of the platform is that birds can lay their nourishment on it. These combined features of the rectangular perch allow for the designing of squirrel-proof bird feeders of small body dimensions and which are economical to operate;

(b) it provides unobstructed access to the feed contained in the feeding cavity, resulting in a feeder that is easy to clean. This design feature is critical for maintaining the good health of the birds that use the feeder, since wet and rotten food could induce disease among them;

(c) it uses the forward-third section of its floor as a feeding area, exposing the maximum amount of bird seed possible while maintaining its selectivity;

(d) it provides for easy adjustment of the balancing action of the platform by repositioning a single weight bar. Additionally, there are no loose parts to be attached to or removed from the feeder's embodiment in order to adjust the tilting action of the platform;

(e) the space created by its feeding cavity and the gate plate allows birds to step inside of the cavity while consuming nourishment, protecting the birds during inclement weather;

(f) it provides for a tilting platform and gate assemblage of simple design and which will function properly in any weather conditions;

(g) the gap between the feeder's retainer plate and the floor allows for uninterrupted flow of feed into the feeding cavity, regardless of the kind of bird seed used;

(h) it provides a simple and efficient latch assemblage for locking the roof to the front wall;

(i) it denies access to squirrels that try to approach the feeding cavity from the roof because the slopping configuration of the roof plate makes squirrels fall off the feeder. Additionally, the perch platform lures squirrels to step on it first; as a result, squirrels fall off the feeder because of the tilting action of the perch;

Although the description above contains many specifications, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A squirrel-proof bird feeder comprising:
   (a) a feed containment structure having spaced and parallel side walls, a front wall spaced and parallel to a rear wall, a retaining plate attached to an inside of said front wall, and a floor mounted perpendicular to and between of said side walls, front wall, and rear wall, and
   (b) a roof plate mounted on said side walls covering said feeder containment structure, said roof plate having an open position and a closed position, said roof plate being secured to said front wall by a latch means, and
   (c) a feeding cavity created by the joining of said sidewalls, front wall, said floor and said retainer plate together, and
   (d) an opening on said front wall to expose said feeding cavity, and
   (e) a fence created by a lower edge of said opening for the purpose of retaining nourishment within said feeding cavity, and
   (f) a balancing frame that circumvents said side walls and said rear wall, said balancing frame being mounted to supporters attached to respective left and right trunions located on said side walls, said balancing frame having a platform attached to its upper end terminal and a weight attached to its lower end terminal, said balancing frome being capable of tilting from an open feeding position to a closed feeding position depending on the weight of the bird sitting on said platform, and
   (g) a rod parallel to said front wall and said floor, said rod being placed in proximity to said retainer plate, said rod extending beyond said side walls and outwards through holes on said side walls to create a self-supporting hanging structure, and
   (h) a gate plate adjacent to and operationally associated to said platform, said gate plate having a lower end terminal tethered to said rod and an upper end terminal that extends beyond said front wall and upwards through said opening and that attaches to respective left and right sections of said balancing frame, said gate plate being substantially placed inside of said feeding cavity in an angular fashion to effect an open feeding position corresponding to that of said platform and in which it contacts the upper edge of said opening, said gate plate having a closed feeding position corresponding to that of said platform and in which it contacts the lower edge of said opening, and
   (i) an adjustable weight attached to the lower end terminal of said balancing frame to effect a balancing action against said platform, said weight being repositioned along a plane of said balancing frame to control the tilting action of said platform, and
   (j) a latch means for securing said roof plate to said front wall, and
   (k) a stand centrally mounted to said floor.

2. The invention of claim 1, wherein said feeder containment structure is made of a weatherproof material capable of resisting persistent biting from rodents, 3. The invention of claim 1, wherein said platform is wooden.

4. The invention of claim 1, wherein said balancing frame is metallic.

5. The invention of claim 1, wherein said supporters have one terminal attached to respective left and right trunnions created by said rod, and the other terminal attached to their respective left and right sections of said balancing frame.

6. The invention of claim 1, wherein said latch means has an upper lock centrally mounted to a forward section of said roof plate and a lower lock centrally mounted to an upper half section of said front wall, said upper lock and lower lock being connected to each other when said roof plate is in a closed position and disconnected when the roof plate is an open position.

7. The invention of claim 1, wherein said weight is metallic.

8. The invention of claim 1, wherein said gate plate has an upper end terminal attached to said balancing frame by means of flanges located at front left and right corners of said gate plate, said flanges embracing their respective left and right sections of said balancing frame, said gate plate having a lower end terminal that is tethered to and pivots on said rod by means of perpendicular flanges located at left and right corners of the gate plate, said gate plate having an open position in respect to said floor and in which provides access to the contents of said feeding cavity, said gate plate having a closed position in which it contacts the lower edge of said opening to shut said feeding cavity.

9. The invention of claim 1, wherein said side walls, front wall, rear wall, floor, roof plate, and retainer plate are connected by means of rivets.

10. The invention of claim 1, wherein said rod is metallic.

11. The invention of claim 1, wherein said stand is secured to said floor by means of rivets.

12. A bird feeder with a balancing platform which serves as a perch, said balancing platform having a gate plate attached to its upper terminal and a movable weight attached to its lower terminal, said gate plate being significantly located inside of said bird feeder in an angular fashion in order to control access to a feeding cavity by rotating from an open (feeding) position to a closed (non-feeding) position, both positions corresponding to those of said balancing platform.

13. The invention of claim 2, wherein said bird feeder has a roof which rotates from an open position to a closed position, said roof being secured to the front wall of said bird feeder by a latch means.

14. The invention of claim 2, wherein said bird feeder has a stand centrally mounted to the floor.

* * * * *

UNITED STATES PATENT AND TRADEMARK OFFICE
CERTIFICATE OF CORRECTION

PATENT NO. : 5,309,867
DATED      : May 10, 1994
INVENTOR(S) : Julio V. Cruz

It is certified that error appears in the above-indentified patent and that said Letters Patent is hereby corrected as shown below:

Column 6, line 1, change  ' Bach' to -- Each --."
   Column 7, line 43, change 'frome' to -- frame --."
   Column 8, line 59, change '2' to --12 --."
   Column 8, line 63, change '2' to -- 12 --."

Signed and Sealed this

Sixth Day of September, 1994

Attest:

BRUCE LEHMAN

*Attesting Officer*      *Commissioner of Patents and Trademarks*